United States Patent [19]

Dussau

[11] Patent Number: 5,443,180
[45] Date of Patent: Aug. 22, 1995

[54] METHOD AND APPARATUS FOR VOLUME APPORTIONMENT OF AND DISTRIBUTING A QUALITY OF PASTY MATERIAL

[75] Inventor: Christian Dussau, Quartier Bourdos, 40320 Geaune, France

[73] Assignees: Sarl Dussau Distribution; Christian Dussau, both of Geaune, France

[21] Appl. No.: 265,715

[22] Filed: Jun. 24, 1994

[30] Foreign Application Priority Data

Jun. 25, 1993 [FR] France ................. 93 07834

[51] Int. Cl.⁶ .......................................... B67B 7/00
[52] U.S. Cl. ........................................ 222/1; 222/63; 222/334
[58] Field of Search ............... 222/1, 56, 61, 63, 233, 222/334, 389, 413, 495, 504, 559; 141/94, 95, 258

[56] References Cited

U.S. PATENT DOCUMENTS

| Re. 29,495 | 12/1977 | Georgi | 222/1 |
|---|---|---|---|
| 3,756,456 | 9/1973 | Georgi | 222/1 |
| 4,537,230 | 8/1985 | Schindel | 141/146 |
| 4,667,709 | 5/1987 | Fischer et al. | 141/258 |
| 4,860,926 | 8/1989 | Juenkersfeld et al. | 141/258 |
| 5,056,036 | 10/1991 | Van Bork | 364/510 |
| 5,080,148 | 1/1992 | Florida | 141/258 |
| 5,127,547 | 7/1992 | Gerich | 222/334 |
| 5,141,408 | 8/1992 | Conrad et al. | 417/339 |
| 5,238,147 | 8/1993 | Yasui et al. | 222/334 |

FOREIGN PATENT DOCUMENTS

| 0100481 | 2/1984 | European Pat. Off. |
| 429354 | 9/1911 | France |
| 1053394 | 3/1959 | Germany |
| 3227616 | 1/1984 | Germany |
| 85/01993 | 5/1985 | WIPO |
| 91/06062 | 5/1991 | WIPO |

*Primary Examiner*—Andres Kashnikow
*Assistant Examiner*—Phillippe Derakshani
*Attorney, Agent, or Firm*—Sandler, Greenblum & Bernstein

[57] ABSTRACT

Method and apparatus for apportionment includes compressing a paste in an apportioning chamber and thereafter delivering the paste towards a nipple after opening of a blocking element, the volume apportioning of the amount of paste to be distributed being undertaken by measuring the displacement of a piston in the apportioning chamber during delivery. The method and apparatus ensure that the apportioning chamber is placed under low pressure so as to facilitate introduction of the paste and delivery of the paste at a fast speed and then at a slow speed.

29 Claims, 6 Drawing Sheets

METHOD AND APPARATUS FOR VOLUME APPORTIONMENT OF AND DISTRIBUTING A QUALITY OF PASTY MATERIAL

BACKGROUND OF THE INVENTION

1. Field of the Invention

The present invention is related to a method for volume apportioning a quantity of paste substance to be distributed and a machine for distributing a paste substance in apportioned quantities using the apportioning method as per the invention.

The paste substance to be distributed in apportioned quantities can be an edible paste intended, for example, to fatten Palmipeds (geese or ducks).

2. Discussion of Background Information

In the field of force-feeding Palmipeds, automatic force feeders are known to be useful, and are basically comprised of a delivery and suction apportioning pump comprising a suction conduit in communication during suction, with a paste tank and a distribution conduit in which the quantity of paste is then delivered towards a force-feeding nipple mounted at the end of the distribution conduit and intubated into the maw of the Palmiped to be force fed.

The delivery and suction apportioning pump comprises a cylindrical apportioning chamber in which is slidably mounted a piston, driven by a motor member towards the front in the direction of delivery and towards the rear in the direction of suction.

The apportioning chamber comprises a terminal shutter wall that is pierced through by two orifices, the delivery conduit being connected to one of the orifices, and the suction conduit being connected to the other.

The suction and delivery conduits are each equipped with a blocking element such as a non-return valve. Such a force-feeding machine is especially disclosed in the patent FR-A-429,354.

This type of machine functions as follows: the blocking element associated to the distribution conduit being closed and the blocking element associated to the suction conduit being open, the piston is moved by the motor member in the direction of suction, and a quantity of paste is introduced axially into the cylindrical apportioning chamber. Then, after closure of the blocking element associated to the suction conduit and opening of the blocking element associated to the distribution conduit, the piston is moved in the direction of delivery and the quantity of paste previously introduced into the apportioning chamber of the pump is axially delivered from the latter towards the force-feeding nipple. The introduction of the paste into the apportioning chamber occurs progressively during the rearward movement of the piston. The apportioning of the amount to be distributed is done during suction and the volume of the quantity distributed is theoretically equal to the volume of the apportioning chamber when the piston is at the rear neutral position. This assumes that the apportioning chamber is filled in its entirety during suction.

It has been noted that with less liquid paste substances, the apportioning chamber only fills partially so that the portion distributed does not correspond to the desired portion. Furthermore, the degree to which the apportioning chamber is filled depends on the degree of liquidity of the edible paste to be distributed. Such edible paste being mainly constituted of water and flour, its degree of liquidity is a direct result of the degree of absorption of water by the flour, which varies over time.

This disadvantage is translated into a variation of the portion distributed and prior art machines do not ensure a precise and constant apportioning of the ration to be distributed.

The maw of Palmipeds (geese, ducks) is a pouch that should receive 300 ml of paste at the start of the force-feeding and 900 ml 12 to 15 days later.

The technique of force-feeding consists of developing this pouch a little more each day in order to increase its capacity in a uniform manner by playing with the elasticity of the maw and consequently, regularly increasing the quantity of food delivered to the animal.

It is important to oversee that force-feeding does not lead to distended maw tissues that are detrimental to the health of the animal. This distension of tissues can be the result of introducing too large a quantity of food into the maw and/or too fast a speed of introduction.

As such, it is important to have perfect control of the portion that is distributed, something which prior art machines do not allow, and to control the speed of introduction.

Prior art machines were envisioned to introduce substances at a slow speed. Although this arrangement enables the dangers of the distension of maw tissues to be partially removed, it remains nonetheless true that a slow speed does not enable the force-feeding to be done at a fast pace.

SUMMARY OF THE INVENTION

The main aim of the present invention is to resolve the above-mentioned problems by implementing a new apportioning method and a machine for distributing an apportioned quantity using the method.

The method, as per the present invention, of volume apportioning a quantity of paste substance to be distributed, including using a machine for distributing a paste substance, such as an edible paste, in apportioned quantities comprising a tank for the paste to be distributed in apportioned quantities, at least one delivery and suction pump constituted by a cylindrical chamber in which is slidably mounted a piston activated by a motor member between a rear neutral position and a front neutral position, the chamber being provided with an inlet orifice connected by means of an inlet conduit to the outlet orifice of the paste tank and a delivery orifice connected by means of a delivery conduit to a nipple for distributing an apportioned paste ration, the orifices or the conduits being each associated to a blocking means capable of assuming, when so ordered, a closed position whereby the passage section of the paste substance is blocked, and an open position whereby the passage section is freed, mainly characterized in that it consists, after blockage of the delivery orifice from the associated conduit and entry of the paste in the pump chamber, the piston being then arranged along its rear neutral position, of blocking the inlet orifice or its associated conduit by action on the corresponding blocking means, of progressively pre-compressing the paste in the pump chamber by piston thrusts on the paste so as to obtain a pre-compression value equal to a set point value at which the paste fills the pump chamber in its entirety and no gap is present either in the chamber or in the mass of the paste, of opening the delivery orifice or the associated conduit, by action on the corresponding blocking means, after the pre-compression value has reached the set point value, of delivering the paste towards the distribution nipple by moving the piston towards its front neutral position and simultaneously measuring the volume of the delivered substance and comparing the value of this measurement to a set point value that is representative of the volume value of the food ration to be distributed, of blocking the delivery orifice or the associated conduit by action on the corresponding blocking means and simultaneously interrupting the movement of the piston as soon as the volume measurement value of the quantity distributed is equal to the set point value that is representative of the volume value of the food ration to be distributed.

It is understood that by virtue of these arrangements, the apportioning of the quantity of substance to be distributed, which can be a food ration intended, for example, to fatten Palmipeds, is done during delivery, after the pump chamber has been filled in its entirety by the paste substance.

Preferably, according to another aspect of the method, the measurement of the delivered quantity is undertaken by measuring the displacement value of the piston in the direction of delivery.

According to another characteristic of the method, the pump chamber is placed under low pressure before introduction of the paste substance, such low pressure being implemented by the withdrawal of the piston after blocking the inlet and delivery orifices by action on the corresponding blocking means.

According to yet another aspect of the method as per the invention, the movement of the piston towards its front neutral position is interrupted when the pre-compression value reaches the set point value and immediately resumes after opening of the delivery orifice or of the associated conduit, the opening being undertaken by action on the corresponding blocking means.

Preferably, according to another aspect of the method as per the invention, the movement of the piston in the direction of delivery first occurs at a fast speed, and then at a slow speed.

Advantageously, according to another aspect of the method as per the invention, the piston is driven at a fast speed as long as the volume measurement value of the delivered paste substance is less than a set point value that is representative of the volume value of the food ration distributed to the Palmiped during the previous force-feeding session.

This arrangement enables apportioning precision to be improved.

Moreover, this arrangement enables a fast pace of force-feeding, while eliminating all risks of distension of the maw tissues of the animal.

Indeed, it has been noted that a high speed introduction of the same quantity of paste that was received by the Palmiped during a previous force-feeding session cannot lead to distension of the maw since the latter has already adapted itself to receive such a volume, only that quantity of substance that is additional with respect to the previous force-feeding is introduced at a slow speed, resulting in a slow increase of the capacity of the maw without the risk of distending the tissues.

The object of the present invention also includes a machine for the distribution of a paste substance in apportioned quantities using the apportioning method described hereinabove, such machine capable of being an automatic force-feeder.

The machine as per the invention for the distribution of an apportioned quantity of paste substance, such as for example, a food ration for force-feeding Palmipeds, comprises a tank for the paste to be distributed in apportioned quantities, at least one delivery and suction pump constituted of a cylindrical chamber in which is slidably mounted a piston activated by a motor member between a rear neutral position and a front neutral position, the chamber being provided with an inlet orifice connected by means of an inlet conduit to the outlet orifice of the paste tank and a delivery orifice connected by means of a delivery conduit to a nipple for distributing apportioned quantities of paste, the orifices or the conduits being each associated to a blocking means capable of assuming, as ordered, a closed position whereby the passage section of the paste-substance is blocked and an open position whereby said section is freed, characterized mainly in that it comprises a measurement means for the displacement of the pump piston in the direction of delivery equipped with a distance counter, a pressure sensor element sensitive to the pressure exerted by the piston on the paste during pre-compression, the pressure sensor element sending a reset to zero signal to the counter when the pre-compression value is equal to the previously selected set-point value, a comparator in order to continuously compare the value of the distance measured by the counter to a previously selected set point value that is representative of the volume value of the portion to be distributed, the comparator sending a signal when the value of the distance measured is equal to the set point value, the signal being sent to the control means that activate or deactivate the motor member of the pump piston and that control the blocking means in the direction of opening.

According to another characteristic of the invention, the comparator continuously compares the value of the distance measured by the counter to a previously selected second set point value that is representative of the volume value of the food ration distributed to the Palmiped during a previous force-feeding session, the comparator sending a signal to the control means when the measured value is equal to the set point value, said control means acting on the motor member of the pump piston to reduce the speed of displacement of such piston.

BRIEF DESCRIPTION OF THE DRAWINGS

Other advantages, characteristics and aims of the invention will become apparent upon reading the description of a preferred embodiment provided as a non-limiting example with reference to the annexed drawings wherein.

DETAILED DESCRIPTION OF THE PREFERRED EMBODIMENTS

Figure 1:
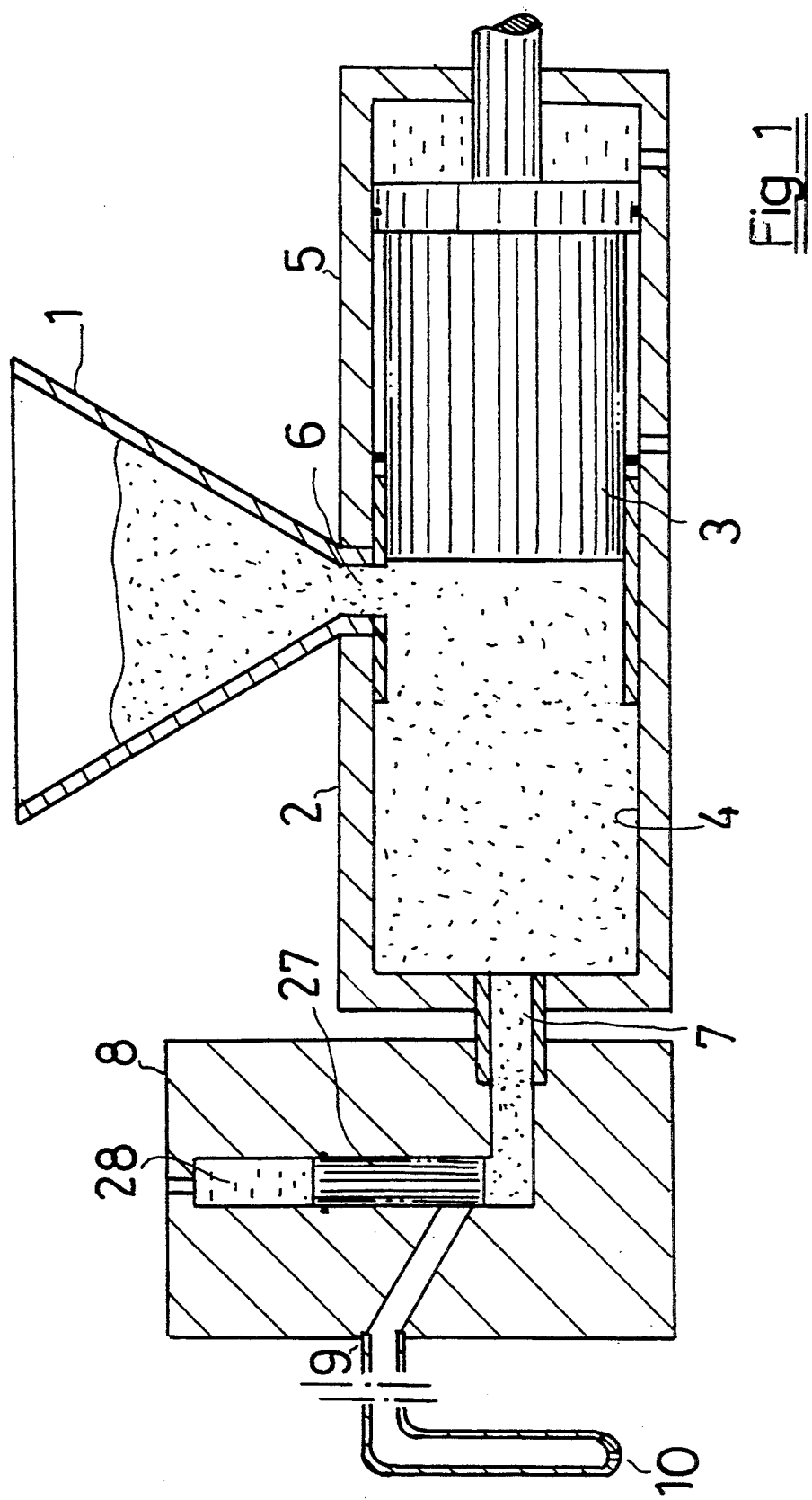
FIGS. 1 through 3 illustrate the method as per the invention.
Figure 2:
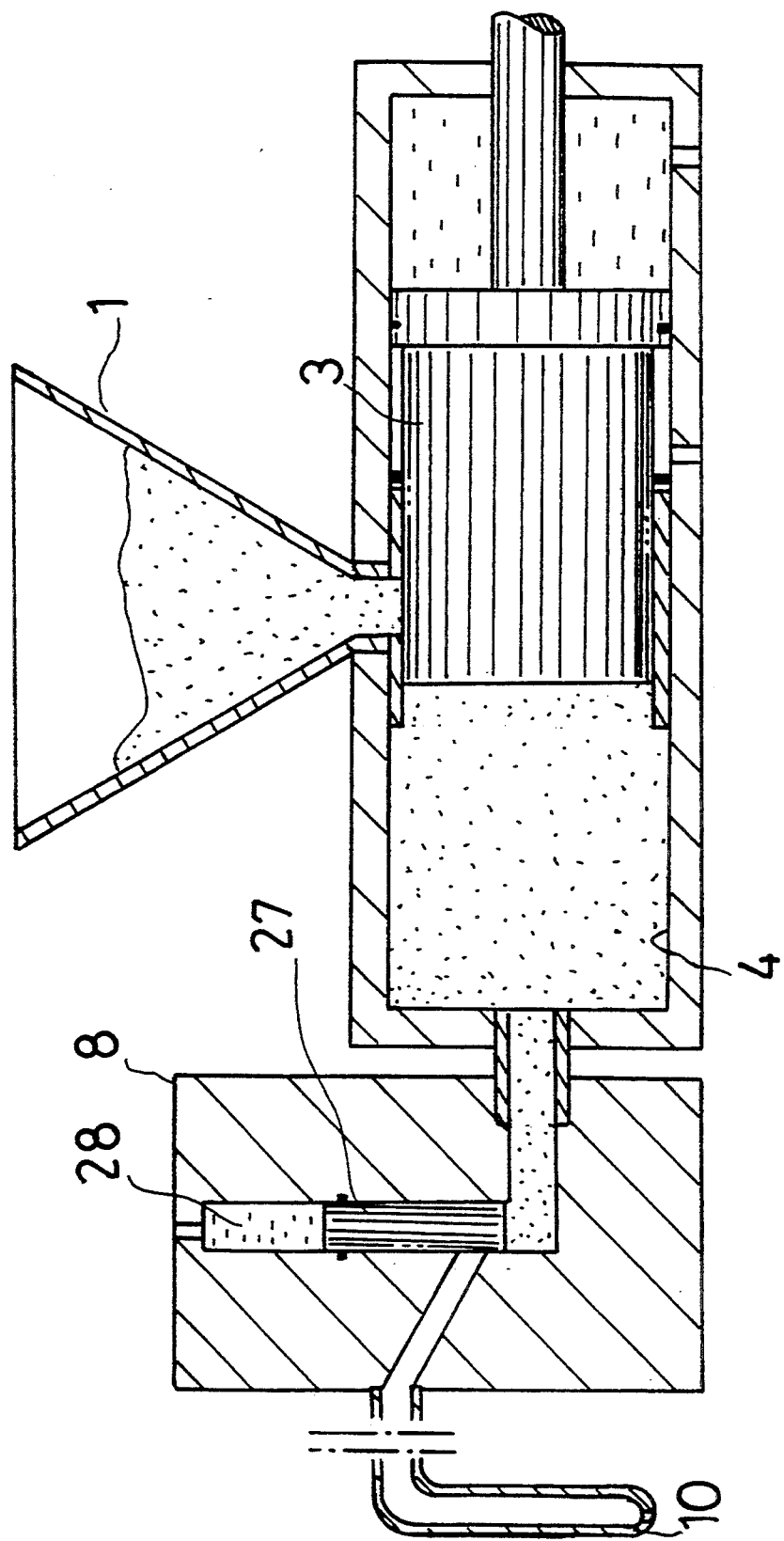
Figure 3:
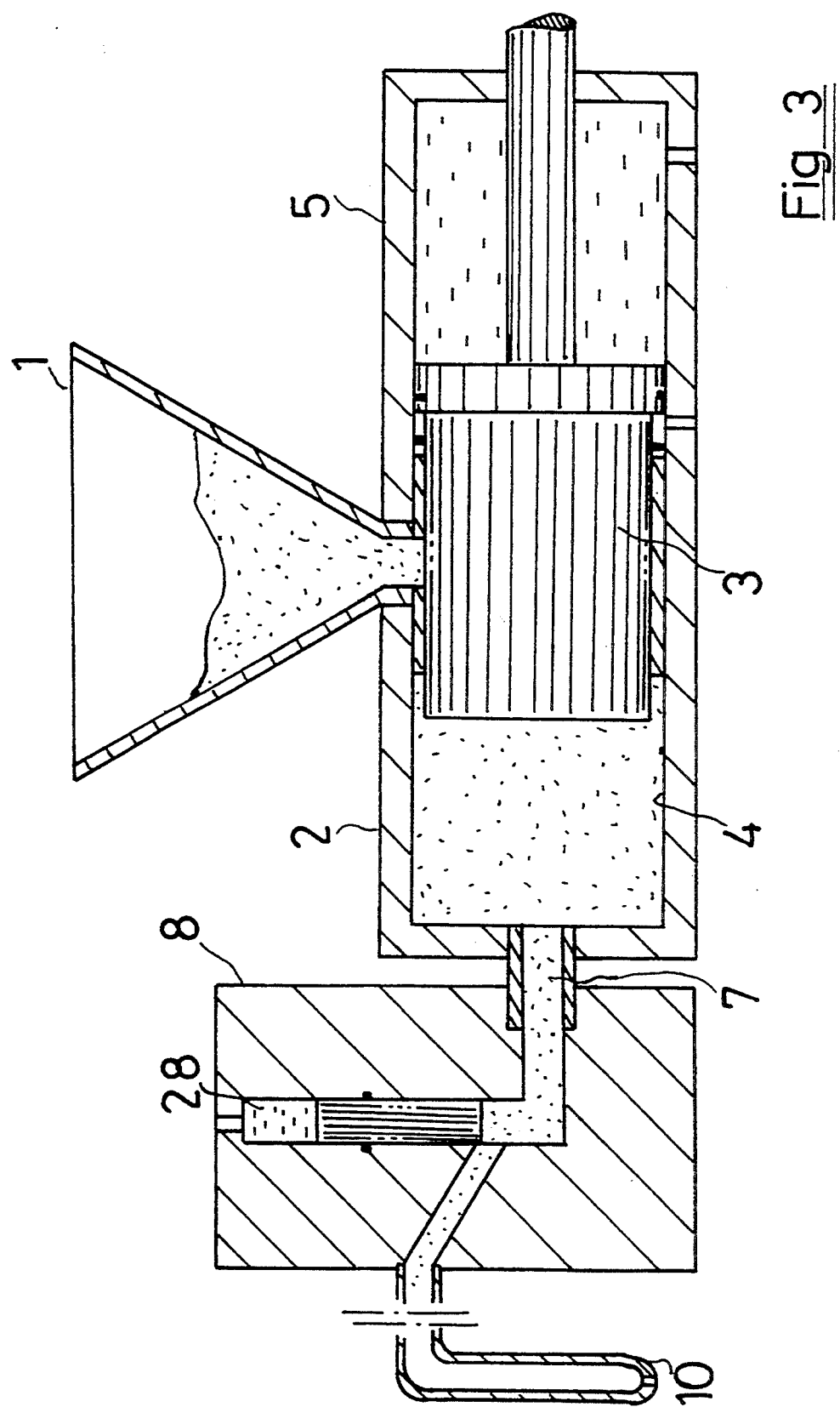
Figure 4:
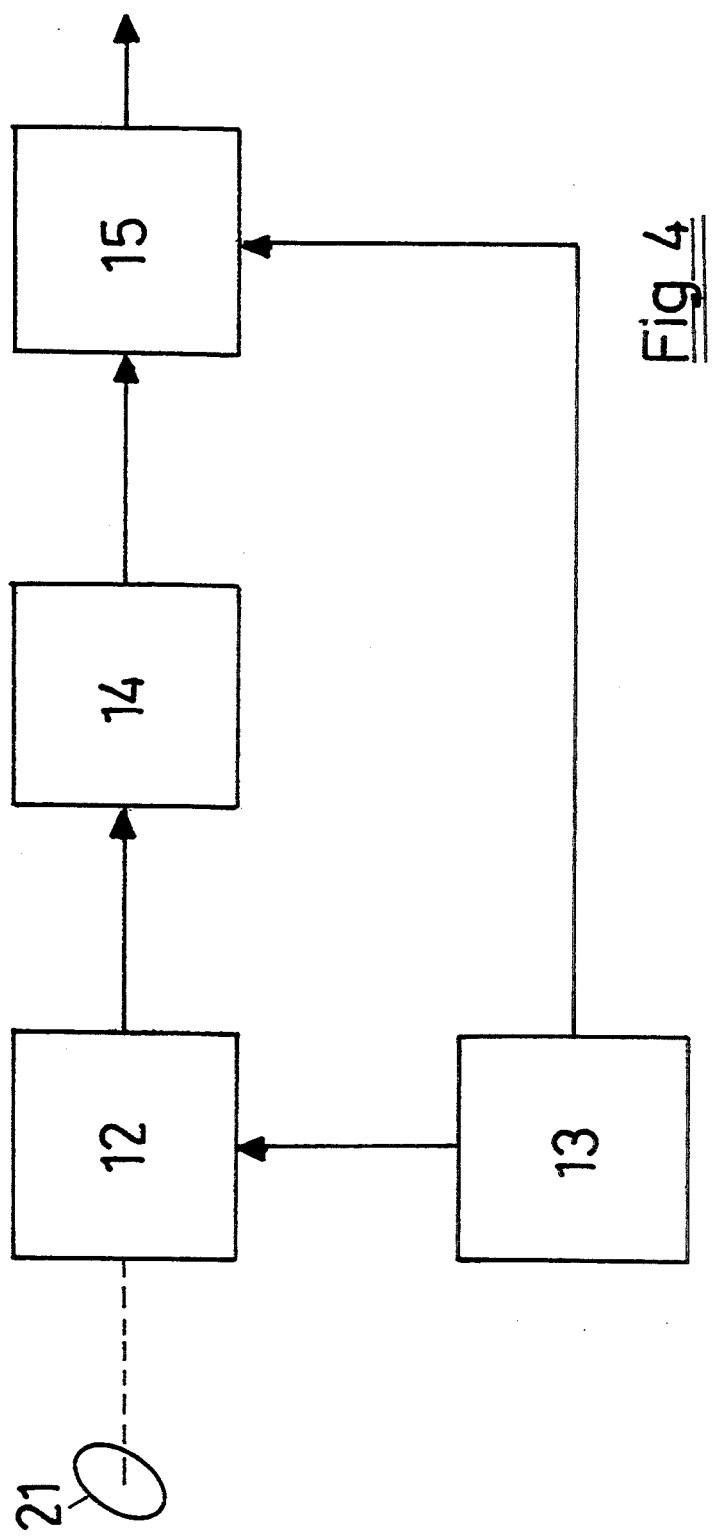
FIG. 4 is a block diagram of the control means of the machine.
Figure 5:
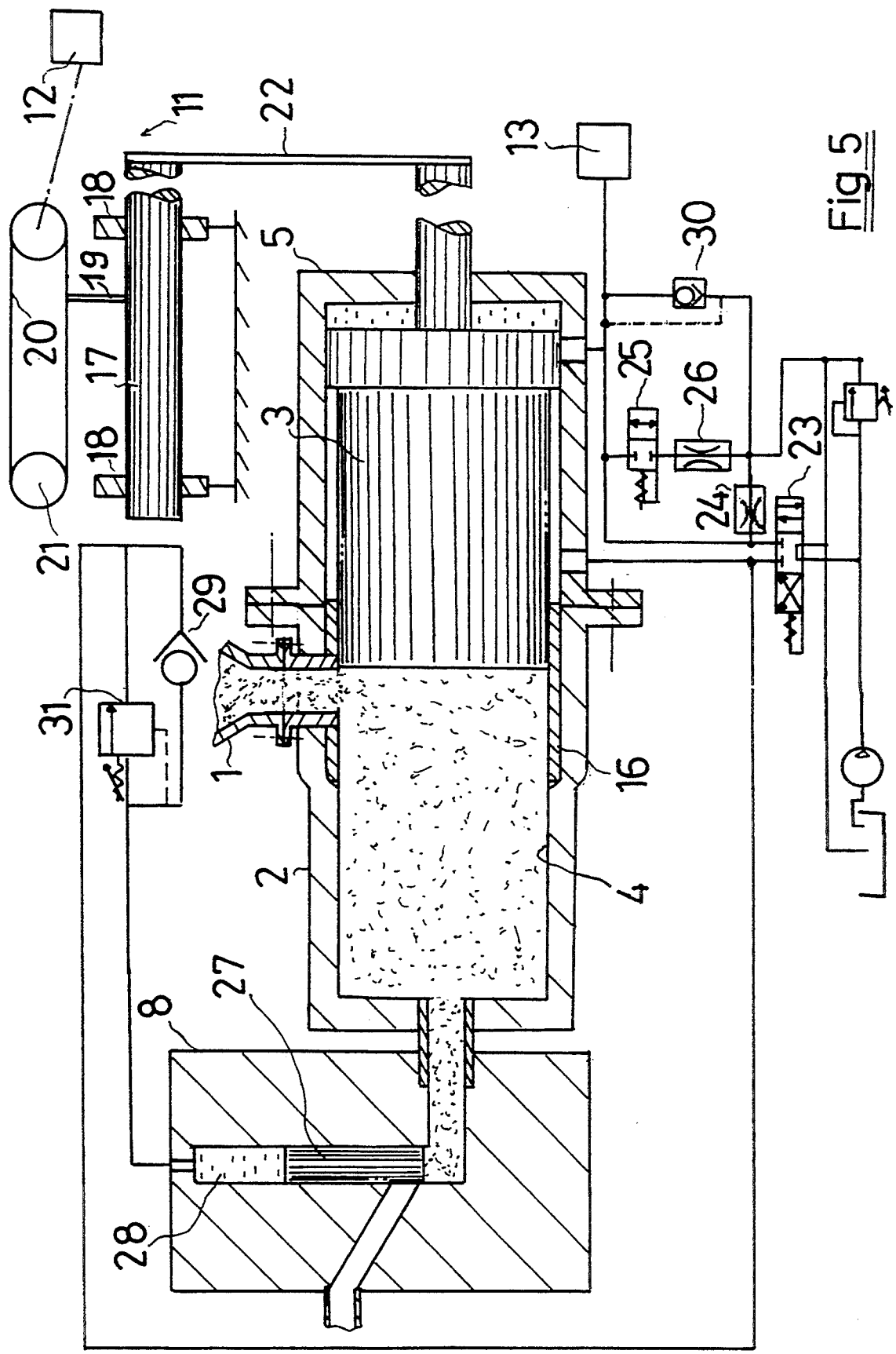
FIG. 5 is a schematic view of the machine as well as of its hydraulic circuit.
Figure 6:
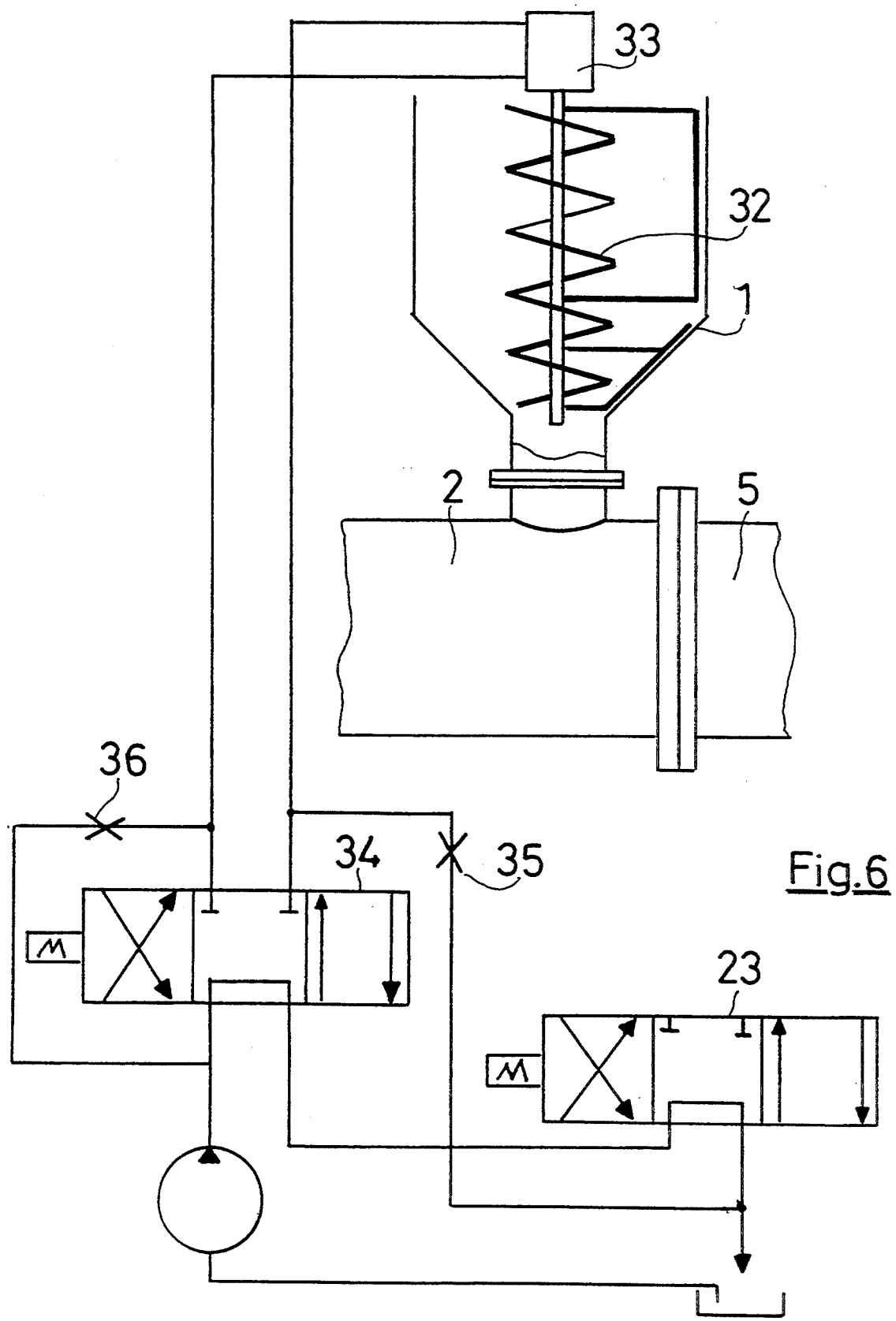
FIG. 6 is a partial view of the machine showing the paste mixing means.

As represented, the machine as per the invention, for example, for the distribution of precisely apportioned food rations to Palmipeds intended for fattening, comprises, on the same frame that can be mounted on a motor-driven or non-motor-driven rolling bearing, a paste tank 1, at least one delivery and suction pump 2 comprising a piston 3 activated by a motor member 5 in the apportioning chamber 4 of pump 2.

This chamber comprises an inlet orifice 6 for the paste arranged in connection with the paste outlet orifice and provided at the lower end of the tank. A first blocking means is associated to this inlet orifice. Furthermore, cylindrical chamber 4, demarcated by a cylindrical envelope, is blocked at its end by a transverse wall in which the delivery orifice 7 has been provided. This orifice is in connection by a joining piece with the inlet orifice of a second blocking means 8 comprising an outlet orifice in connection with delivery conduit 9 which ends in a force-feeding nipple 10, such delivery conduit being constituted, for example, by a rigid vertical portion connected at the lower end to the blocking means, by a second rigid horizontal portion connected by a rotating joint to the previous one, by a third rigid horizontal portion connected to the second portion by a rotating joint and by a flexible high pressure channel portion connected by a sleeve to the third rigid portion and comprising a force-feeding nipple 10 at its end. The flexible portion can have substantial length.

Paste tank 1, of a cylindro-conical shape for example, can be connected to the inlet orifice of pump chamber 4 by means of a channel or else, as per the preferred embodiment of the invention, in its lower portion, the tank comprises a neck that is fixed by straps, with interspersed sealing elements, to a pump nozzle, axially extending the inlet orifice.

According to the invention, the machine comprises a measurement means 11 for the displacement of the piston in the paste delivery direction, equipped with a distance counter 12, a pressure sensor element 13, a comparator 14 and control means 15.

Inlet orifice 6 can be arranged in the transverse blocking wall of chamber 4, but as per a preferred embodiment of the invention, such inlet orifice 6 is provided in the cylindrical envelope, radially with respect to chamber 4 and at a distance therefrom.

By virtue of this embodiment, the blocking means of the inlet orifice is constituted by pump piston 3, the piston being located behind the inlet orifice, in its rear neutral position, in order to free such inlet orifice.

Preferably, at least along a portion of its length, extending on either side of inlet orifice 6, chamber 4 has a bore that is machined with low manufacturing tolerance. Piston 3 is machined with low manufacturing tolerance such that the fitting of the piston in such bore is done with great precision and the functional clearance between the piston and such bore is as small as possible in order to resist passage of the paste. However, the functional clearance is big enough to enable passage of air.

Thus, during pre-compression or during delivery, the paste cannot infiltrate between the piston and the bore and reflux towards the inlet orifice and the air possibly present in the apportioning chamber can get released. This configuration is particularly advantageous because it avoids the use of sealing joints on the piston and does away with the problems that result from the quick wear and tear of such sealing joints.

According to a preferred embodiment of the invention, the above-cited bore is incorporated in a ring 16 that can be made of an anti-friction material, such ring being mounted in an annular housing of chamber 4.

Ring 16 is pierced through with a radial orifice provided synchronously with the radial orifice arranged in the cylindrical envelope and forms inlet orifice 6 in conjunction with the latter. Advantageously, the edge of inlet orifice 6 in the chamber is square-edged, which enables, along with the piston, the formation of a guillotine, adapted to trim the grains of corn and other elements located at this level and carried along by the paste. As such, it becomes possible with such a machine to distribute a paste containing non-crushed ingredients without risking blockage of the piston at the level of the inlet orifice.

As an example, the displacement measuring means of the piston in the direction of delivery of the paste substance comprises, in addition to the distance counter, a shaft 17 axially guided in bearings 18 in parallel to the direction of displacement of piston 3, the shaft being connected to the piston so as to be translationally driven by the latter and the shaft 17 comprising a radial finger 19 fixed at one of the ends of an endless belt 20 stretched between two pulleys 21 one of which is in engagement with the distance counter 12 which is constituted by an incremental encoder.

Other distance measuring means can also be used.

The incremental encoder sends a code that is continuously compared by comparator 14 to the set point value (provided in the form of a code) that is representative of the volume value of the ration to be distributed and to the set point value (provided in the form of a code) that is representative of the volume value of the ration distributed during a previous force-feeding session.

Both codes are sent by any means known to a person skilled in the art. It is possible to display and select such set point values via such means.

Advantageously, the motor member 5 for activation of piston 3 between its front and rear neutral positions is a high pressure, dual shaft, dual effect hydraulic jack comprising a front chamber and a rear chamber, both connected to a high pressure hydraulic circuit, one of the shafts of the jack, the one that is in the front chamber thereof, constituting piston 3 of pump 2. The jack is located fixedly behind the pump against the cylindrical envelope of the chamber thereof. The front chamber of the jack is fed to cause the withdrawal movement of the pump piston and the rear chamber of the jack is fed to cause the pre-compression and movement of the pump piston in the direction of delivery.

The use of a high-pressure jack connected to a high-pressure hydraulic circuit enables substantial power to be attained which contributes to improving the precision of the apportionment.

In addition, the use of high power enables one to overcome the disadvantages linked to losses of head and enables the distribution of the food ration at a long distance from the pump.

The body of the hydraulic jack is fixed by straps, with interposition of sealing elements, to the cylindrical envelope of the chamber.

One or several known sealing elements will be arranged around piston 3 in the body of the jack, behind ring 16.

The jack shaft associated to the rear chamber of the jack fixedly receives, outside the jack body, an arm 22 affixed to one of the ends of shaft 17 of the distance measuring means. This arm thus ensures the transmission of movement between the shafts of such jack and shaft 17.

The hydraulic circuit associated to jack 5 is arranged, for example, in a metallic block and is controlled by means 15 and comprises a tri-positional hydraulic distributor 23, piloted electrically and comprising a central stand-by and blocking position of the jack. In the second position, this distributor 23 feeds the front chamber of the jack, and in the third position, feeds the rear chamber of the jack.

The latter chamber is fed to first achieve pre-compression, and then, the delivery of the substance. During the pre-compression, under the effect of the piston thrust, the paste is delivered to fill chamber 4 in its entirety, and under the compression effect to which it is subject, the gaps possibly present in its mass are filled. Moreover, if the chamber or the mass contain air pockets, under the pre-compression effect, these are refluxed towards the piston.

The evacuation of air from the apportioning chamber is done by passage between the bore of ring 16 and piston 3 in the direction of inlet orifice 6.

The equality between the pre-compression value and the set point value is detected by pressure sensor element 13 that is constituted by a pressure sensitive switch associated to the rear chamber of jack 5 or to the feeding channel of the chamber, the pressure sensitive switch sending an electrical reset to zero signal to the distance counter as soon as the value of the hydraulic pressure in the rear chamber of the jack is equal to its calibration value.

The electrical signal is also sent to means 15 which, by action on the pilot of distributor 23, then brings the latter back to the central blocking position of the jack, while waiting for a signal to resume functioning, at which distributor 23 is brought back along its second position to feed the rear chamber of the jack and deliver the paste.

This signal can be sent automatically, for example, by a delay time or by a push button activated by the user.

The pressure sensitive switch used is preferably adjustable in order to adjust the set point value.

It should be noted that the adjustment threshold of the pre-compression value is established in such a way that it is as close as possible to the losses of head generated by the distribution circuit of the paste, so as to avoid, as far as possible, the density variation effects of the paste that can be compressed.

An output regulator 24 is connected to the feeding channel of the rear chamber of jack 5, such regulator being adjustable and diverting a portion of the supply oil output of the rear chamber of the jack towards the oil tank associated to the high pressure pump of the hydraulic circuit.

By adjusting this output regulator, it becomes therefore possible to adjust the value of the high speed delivery.

A solenoid valve 25 is also connected to the feeding channel of the rear chamber of the jack, a second output regulator 26 being connected to such solenoid valve.

When the solenoid valve is activated, an additional portion of the supply oil output of the rear chamber of the jack is diverted towards the oil tank by passing through output regulator 26.

Solenoid valve 25 is activated by control means 15 when the value given by counter 12 is equal to the set point value that is representative of the volume value of the food ration distributed the day before.

By virtue of this arrangement, the piston is driven in the direction of delivery at a slower speed than previously.

The value of this speed is adjusted by action on the second output regulator 26.

When the desired quantity of substance has been distributed, distributor 23 is brought back into its third position by action of control means 15, such that the oil under pressure is injected into the front chamber of the jack in order to bring piston 3 towards its rear neutral position.

This withdrawal movement occurs after activation of blocking means 8 and closure thereof.

The activation of blocking means 8 can be controlled by means 15.

The withdrawal movement of piston 3 places apportioning chamber 4 of the pump under low pressure so as to facilitate, after disengagement from inlet orifice 6, the introduction of a new quantity of paste in chamber 4.

In order to increase the pace of force-feeding, the withdrawal of piston 3 occurs quickly. Because of this, the maximum volume of the front chamber of jack 5 is low, the piston diameter being relatively large in comparison with that of the front chamber. As such, a rapid return of the piston will be obtained with a very little oil output.

The jack shaft, mobile in the rear chamber thereof, has a small diameter. This can be explained by the necessity of freeing the largest thrust surface for the jack piston, but due to this arrangement, the maximum volume of the rear chamber is high, such that a quick return of piston 3 assumes that the rear chamber of the jack can be emptied quickly.

For this reason, a non-return valve 30 is connected onto the feeding channel of the rear chamber of the jack, the valve being piloted by the pressure in the front chamber of the jack or in its feeding channel.

When the front chamber of the jack is fed, the non-return valve is controlled in the direction of opening and the oil of the rear chamber of the jack is directed directly towards the oil tank without passing through distributor 23.

The blocking means 8 of delivery orifice 7 can be constituted by a solenoid valve of a known type controlled by means 15, by a valve activated by a jack controlled by means 15 or by any other element ensuring complete blockage, disallowing any leakage of the substance, but preferably blocking means 8 comprises a body provided with a bore in which are emptied two orifices, one of which, the first, being connected to delivery orifice 7 of pump 2 and the other to delivery channel 9, the bore slidably receiving a piston 27 capable of assuming a blocking position whereby at least the second orifice is blocked and a freeing position of the orifices, the piston forming with the bore a chamber 28 connected by a hydraulic channel to the feeding channel of the front chamber of jack 5 via a non-return valve 29, such that during the feeding of the jack chamber, the oil under pressure is injected through the non-return valve into chamber 28 of blocking means 8 and that piston 27 gets to block at least the second radial orifice.

Preferably, the two radial orifices of the blocking means are offset axially with respect to the bore and in the blocking position the piston only blocks the second radial orifice.

It must be noted that the fitting of piston 27 in the bore is done with great precision and that the functional clearance between the piston and the bore disallows any reflux of the paste towards chamber 28.

Preferably, a pressure relief valve 31 is provided, connected to the feeding channel of chamber 28 of blocking means 8 and located in parallel with the non-return valve 29, the freeing of the second orifice being done by a withdrawal of piston 27 under the effect of the thrust of the paste delivered from the pump chamber, this withdrawal movement being undertaken when the pressure exerted by the paste on piston 27 is greater than the calibration pressure of pressure relief valve 31, the calibration pressure being greater than the calibration pressure of pressure sensitive switch 13 so as to stop piston 27 from withdrawing during the pre-compression of the paste.

In addition, the second orifice is oblique with respect to the bore axis, whereas the first is perpendicular with respect to the bore.

By virtue of these arrangements, while the paste is delivered in the delivery conduit, piston 27 maintains high pressure on the paste, whereby the water absorbed by the paste is expressed, rendering the paste more liquid.

The advantage of such a blocking means also lies in the fact that the blockage is done automatically and very fast as soon as the front chamber of the jack is fed and also in the fact that the blocking position is maintained as long as the paste delivery does not occur.

In addition, it must also be noted that piston 27 is brought into the blocking position before the withdrawal of piston 3, thus eliminating all risks of the paste refluxing into the apportioning chamber 4 when the latter is placed under low pressure.

In a variation, the non-return valve 29 can be replaced by a solenoid valve connected to the feeding channel of the chamber of the blocking means and arranged in parallel with the non-return valve, the solenoid valve being controlled electrically by the control means.

Preferably, the machine is equipped with a thrusting means of the paste of tank 1 towards the chamber of the apportioning pump so as to, along with the low pressure prevalent in the chamber, quickly introduce the paste in the chamber.

According to a first embodiment, the thrusting means is constituted by a volume of gas under pressure confined in tank 1 above the paste.

According to another embodiment, the thrusting means is constituted by an endless screw 32 of a mixing system equipping tank 1.

The aim of this mixing system is to ensure the mixing of the various components used in the paste composition and comprises, in addition to the screw, scraping elements for the paste deposited on the conical and cylindrical walls of the tank, such scraping elements being affixed to the screw axis.

Furthermore, the mixing system comprises a hydraulic motor 33 to rotationally drive the screw in one or the other direction.

The screw is arranged vertically, in the axis of the inlet orifice and is rotationally guided in its bearings.

Hydraulic motor 33 is fed with hydraulic fluids by a tri-positional distributor 34.

The hydraulic circuit constituted by the hydraulic motor, the distributor and the associated hydraulic channels is placed serially with the hydraulic feeding circuit of jack 5 between the pressure source and the circuit.

Distributor 34 directly feeds the hydraulic circuit of jack 5 in its median position. In the second position of the distributor, hydraulic motor 33 is supplied with oil and drives screw 32 along a direction that pushes the paste downwardly. In the third position of the distributor, motor 33 drives the screw in the inverse direction.

In order for the screw to turn very slowly in the direction of the downward thrust of the paste when distributor 34 is in its median position, two valves 35 and 36 connecting distributor 34 in parallel are provided.

Moreover, by virtue of the presence of such nozzles that form a leakage section, the hydraulic motor will be driven very fast when the pressure in the chamber of jack 5 is high. High pressure is obtained in such chamber when the degree of low pressure in apportioning chamber 4 is at a maximum. Thus, shortly before disengagement of inlet orifice 6 and shortly thereafter, the pressure exerted by the screw on the paste is maximum, and this greatly facilitates introduction of the paste in chamber 4.

The machine as has been described can be used for force-feeding Palmipeds and more generally, for the distribution of apportioned quantities of edible paste.

It is understood that the present invention can be adapted to all other arrangements and variations in equivalent technical fields without leaving the scope of the present patent.

I claim:

1. Method for volume apportionment of a quantity of paste substance to be distributed in an apparatus for distributing a paste substance in apportioned quantities, comprising:
   a tank for the paste substance to be distributed in an apportioned ration including an outlet orifice;
   at least one delivery and suction pump comprising a first cylindrical chamber including an inlet orifice and a delivery orifice;
   an inlet conduit connecting said inlet orifice of said first chamber to said outlet orifice of said tank;
   a first piston slidably mounted in said first chamber;
   a motor member for activating said first piston between a rear neutral position and a front neutral position;
   a delivery conduit connecting said delivery orifice to a distribution nipple;
   a blocking element associated with one of said delivery orifice and said delivery conduit, said blocking element being positionable between a closed position wherein passage of the paste substance is blocked and an open position enabling passage of the paste substance to said distribution nipple, so that in the closed position with one of said delivery orifice and said delivery conduit blocked and entry of the paste substance in said first chamber, said first piston is arranged at the rear neutral position;
   the method comprising:
   progressively pre-compressing the paste substance in the first chamber by thrusts of the first piston on the paste substance in order to obtain a pre-compression value equal to a set point value at which the paste substance entirely fills the first chamber, and no gap is present in the first chamber and in the mass of the paste substance;
   opening one of the delivery orifice and the delivery conduit by action on the corresponding blocking element, after the pre-compression value has reached the set point value;

delivering the paste substance towards the distribution nipple by movement of the first piston towards the front neutral position, and simultaneously measuring the volume of delivered paste substance and comparing the value of this measurement to a set point value that is representative of a volume value of the paste substance ration to be distributed;

blocking one of the delivery orifice and the delivery conduit by action on the corresponding blocking element and simultaneously interrupting movement of the first piston as soon as the value of the volume measurement of the quantity of paste substance distributed is equal to the set point value that is representative of the volume value of the paste substance ration to be distributed.

2. The apportioning method as defined by claim 1, wherein the measurement of the delivered quantity comprises measuring the displacement value of the first piston in direction of delivery from the rear neutral position to the front neutral position.

3. The apportioning method as defined by claim 1, wherein the first chamber is placed under low pressure before introduction of the paste substance, by withdrawal of the first piston after blockage of the delivery and inlet orifices by action on the corresponding blocking element.

4. The apportioning method as defined by claim 1, wherein movement of the first piston towards the front neutral position is interrupted when the pre-compression value reaches the set point value and resumes immediately after opening of one of the delivery orifice and the delivery conduit, the opening being undertaken by action on the corresponding blocking element.

5. The apportioning method as defined by claim 1, wherein movement of the first piston in direction of delivery from the rear neutral position to the front neutral position is first at a fast speed, then at a slow speed.

6. The apportioning method as defined by claim 5, wherein the first piston is driven at a high speed as long as the value of the volume measurement of the delivered paste substance is less than the set point value that is representative of the volume value of the paste substance ration distributed in a previous distribution.

7. The apportioning method as defined by claim 6, wherein the paste substance is for feeding palmipeds, and the set point value is representative of the paste substance distributed during a previous force-feeding session of the Palmipeds.

8. Apparatus for distributing an apportioned quantity of paste substance, such as a food ration for force-feeding palmipeds, comprising:

a tank for the paste to be distributed in an apportioned ration including an outlet orifice;

at least one delivery and suction pump comprising a first cylindrical chamber including an inlet orifice and a delivery orifice;

an inlet conduit connecting said inlet orifice of said first chamber to said outlet orifice of said tank;

a first piston slidably mounted in said first chamber;

a motor member for activating said first piston between a rear neutral position and a front neutral position;

a delivery conduit connecting said delivery orifice to a distribution nipple;

a blocking element associated with one of said delivery orifice and said delivery conduit, said blocking element being positionable between a closed position wherein passage of the paste substance is blocked and an open position enabling passage of the paste substance to said distribution nipple;

a measuring element to measure displacement of said first piston in a direction of delivery between the rear neutral position and the front neutral position, said measuring element comprising a distance counter, a pressure sensor element, a comparator and a control element, said pressure sensor element being sensitive to pressure exerted by said first piston on the paste substance during pre-compression wherein the paste substance in the first chamber is pre-compressed by thrusts of said first piston on the paste substance in order to obtain a pre-compression value equal to a set point value at which the paste substance entirely fills said first chamber, and no gap is present in said first chamber and in the mass of the paste substance, said pressure sensor element being capable of sending a reset to zero signal to said distance counter when the pre-compression value is equal to the previously selected set point value, and said comparator continuously compares the value of distance measured by said distance counter to a previously selected distance set point value representative of a volume value of a portion of paste substance to be distributed, said comparator sending a signal when a value of distance measured is equal to the distance set point value, said signal being sent to said control element to activate or deactivate said motor member.

9. The apparatus as defined by claim 8, wherein said comparator continuously compares the value of the distance measured by said distance counter to a second previously selected distance set point value that is representative of the volume value of the paste substance ration distributed during a previous force-feeding session, said comparator sending a signal to said control element when the value measured is equal to the second set point value, said control element acting on said motor member to reduce speed of displacement of said first piston.

10. The apparatus as defined by claim 8, wherein said measuring element includes a shaft axially guided in bearings parallel to the direction of displacement of said first piston, said shaft being connected to said first piston to be translationally driven by said first piston, said shaft comprising a radial finger fixed to one end of an endless belt stretched between two pulleys, one of said two pulleys being in engagement with said distance counter.

11. The apparatus as defined by claim 10, wherein said distance counter comprises an incremental encoder.

12. The apparatus as defined by claim 8, wherein said first chamber comprises a cylindrical envelope blocked at a front end by a transverse wall including said delivery orifice, and said inlet orifice is positioned in said cylindrical envelope, radially with respect to said first chamber, at a distance from said transverse wall.

13. The apparatus as defined by claim 8, wherein said first chamber includes a length, and, at least along a portion of the length of the first chamber that extends On either side of said inlet orifice, said first chamber comprises a bore machined with low manufacturing tolerance, so that functional clearance between said bore and said first piston is as small as possible to resist passage of the paste substance, but large enough to enable passage of air.

14. The apparatus as defined by claim 13, wherein said bore is composed of a ring.

15. The apparatus as defined by claim 13, wherein said radially, positioned inlet orifice in said first chamber is square-edged 16. The apparatus as defined by claim 13, wherein said inlet orifice is blocked as said first piston moves to the front neutral position, said first piston, in its rear neutral position, being located behind said inlet orifice so that said inlet orifice is unblocked.

17. The apparatus as defined by claim 13, wherein said motor member for activating said first piston between the front and rear neutral positions comprises a high pressure, dual shaft, dual effect hydraulic jack comprising a front chamber and a rear chamber, both connected to a high pressure hydraulic circuit, said first piston comprising one shaft of said jack in said front chamber, and said jack being fixedly located behind said at least one delivery and suction pump against said cylindrical envelope of said first chamber, said front chamber of said jack being supplied to cause movement of said first piston towards the rear neutral position, and said rear chamber of said jack being supplied to cause the pre-compression and movement of said first piston in the direction of delivery towards the front neutral position 18. The apparatus as defined by claim 17, wherein said pressure sensor element comprises a pressure sensitive switch associated with one of said rear chamber of said jack or a feeding channel of said rear chamber, said pressure sensitive switch sending an electrical reset to zero signal to said distance counter as soon as the value of hydraulic pressure in said rear chamber of said jack is equal to a calibration value.

19. The apparatus as defined by claim 17, wherein said blocking element comprises:
a body including a bore having two radial orifices, a first orifice of said two orifices being connected to said delivery orifice, and a second orifice of said two orifices being connected to said delivery conduit; and
a second piston positioned in said bore slidable between a blocking position whereby at least the second orifice is blocked and a free position wherein said two orifices are unblocked, said second piston forming with said bore a second chamber connected by a hydraulic conduit to a supply conduit of said front chamber of said jack via a non-return valve, such that during feeding of said front chamber of said jack, oil under pressure is injected through said non-return valve into said second chamber, and said second piston blocks at least said second orifice.

20. The apparatus as defined by claim 19, wherein said two radial orifices are axially offset in said bore, and, in said blocking position, said second piston only blocks said second orifice.

21. The apparatus as defined by claim 20, comprising a pressure relief valve connected to said hydraulic conduit of said second chamber and located in parallel with said non-return valve, unblocking of said second orifice being effected by movement of said second piston under thrust effect of paste substance delivered from said first chamber, such withdrawal movement occurring when pressure exerted by the paste substance on said second piston is greater than a calibration pressure of said pressure relief valve, the calibration pressure of said pressure relief valve being greater than a calibration pressure of said pressure sensitive switch so as to stop the movement of said second piston during pre-compression of the paste substance.

22. The apparatus as defined by claim 20, comprising a solenoid valve connected to said hydraulic conduit of said second chamber in parallel with said non-return valve, said solenoid valve being electrically controlled by said control element.

23. The apparatus as defined by claim 21, wherein said bore comprises a longitudinal axis, said second orifice is oblique with respect to said axis, and said first orifice is perpendicular to said axis.

24. The apparatus as defined by claim 8, wherein said blocking element comprises a body including a bore having two radial orifices, a first orifice of said two orifices being connected to said delivery orifice, and a second orifice of said two orifices being connected to said delivery conduit, a second piston positioned in said bore slidable between a blocking position whereby at least the second orifice is blocked and a free position wherein said two orifices are unblocked.

25. The apparatus as defined by claim 24, wherein said two radial orifices are axially offset in said bore, and in said blocking position, said second piston only blocks said second orifice.

26. The apparatus as defined by claim 8, comprising means for thrusting the paste substance from said tank towards said first chamber, so as to quickly introduce the paste into said first chamber in conjunction with low pressure prevalent in said first chamber 27. The apparatus as defined by claim 26, wherein said means for thrusting comprise a motorized endless screw of a mixing system associated with said tank.

28. The apparatus as defined by claim 17, comprising:
a motorized endless screw of a mixing system associated with said tank to thrust,the paste substance from Said tank towards said first chamber, so as to quickly introduce the paste into said first chamber in conjunction with low pressure prevalent in said first chamber; and
a hydraulic motor for rotationally driving said endless screw, said hydraulic motor being associated with a hydraulic distributor in a hydraulic circuit arranged serially with said hydraulic circuit of said jack; and said hydraulic distributor is parallely connected by two nozzles.

29. The apparatus as defined by claim 26, wherein said means for thrusting comprise elements for confining a volume of gas under pressure above the paste substance in said tank.

* * * * *

UNITED STATES PATENT AND TRADEMARK OFFICE
CERTIFICATE OF CORRECTION

PATENT NO. : 5,443,180
DATED : August 22, 1995
INVENTOR(S) : Christian DUSSAU

It is certified that error appears in the above-indentified patent and that said Letters Patent is hereby corrected as shown below:

On the cover, in section [54], the title, line 3, change "QUALITY" to ---QUANTITY---.
At column 1, line 4, change "QUALITY" to ---QUANTITY---.

At column 12, line 63 (claim 13, line 4), change "On" to ---on---.
At column 13, line 5 (claim 15, line 3), after "square-edged" insert ---.---.
At column 13, line 26 (claim 17, line 16), after "position" insert ---.---.
At column 14, line 39 (claim 26, line 5), after "chamber" insert ---.---.
At column 14, line 45 (claim 28, line 3), change "thrust.the" to ---thrust the---.
At column 14, line 46 (claim 28, line 4), change "Said" to ---said---.

Signed and Sealed this

Nineteenth Day of November, 1996

*Attest:*

BRUCE LEHMAN

*Attesting Officer*  *Commissioner of Patents and Trademarks*